United States Patent [19]

Mueller et al.

[11] Patent Number: 5,801,829
[45] Date of Patent: Sep. 1, 1998

[54] METHOD FOR MEASURMENT AND COMPENSATION OF STRAY LIGHT IN A SPECTROMETER

[75] Inventors: Beno Mueller, Ettlingen; Roland Martin, Karlsruhe, both of Germany

[73] Assignee: Hewlett-Packard Company

[21] Appl. No.: 598,363

[22] Filed: Feb. 8, 1996

[30] Foreign Application Priority Data

Feb. 25, 1995 [EP] European Pat. Off. ............ 95102729

[51] Int. Cl.⁶ ............................................. G01J 3/28
[52] U.S. Cl. .................................................. 356/326
[58] Field of Search ............................. 356/326, 328, 356/305, 307, 330–334, 319; 364/571.01, 571.02, 571.05, 574, 572

[56] References Cited

U.S. PATENT DOCUMENTS 4,526,470  7/1985  Kaye ........................................ 356/319
4,798,464  1/1989  Boostrom ................................ 356/328

FOREIGN PATENT DOCUMENTS 0449442  10/1991  European Pat. Off. .
0652423   5/1995  European Pat. Off. .
3211571   1/1983  Japan .
60-079248  5/1985  Japan .
2119086   11/1983  United Kingdom .

OTHER PUBLICATIONS

Patent Abstracts of Japan, vol. 009, No. 221, p. 386, 7 Sep. 1985 & JP-A-60 079248 (Hitachi Seisakusho KK) 7 May 1985 *abstract* only.

*Primary Examiner*—K. Hantis
*Attorney, Agent, or Firm*—Augustus W. Winfield

[57] ABSTRACT

A method of measuring and compensating the effects of stray light in a spectrometer and use of the method to improve linearity and accuracy in the spectrometer. Light from a broadband light source (100) is blocked in a particular band of wavelengths by an optical filter (104) and light outside the particular band of wavelengths is transmitted by the filter. A spectral measurement within the particular band measures aggregate offset, including the effects of stray light, dark current and electronic offset. In absorption spectrometry, a first spectral measurement within the particular band is measured with a chemical sample not present and a second measurement is made with a chemical sample present. The first spectral measurement is used for compensation of a reference spectrum and the second spectral measurement is used for compensation of a sample spectrum, each within the particular band. Further compensation is made for insertion loss of a filter and stray light having wavelengths within the band of wavelengths of the particular band.

7 Claims, 1 Drawing Sheet

METHOD FOR MEASURMENT AND COMPENSATION OF STRAY LIGHT IN A SPECTROMETER

BACKGROUND OF THE INVENTION

1. Field of Invention

This invention relates generally to spectrometry and more specifically to reduction of the effects of stray light in spectrometry.

2. Description of the Prior Art

Spectrometers measure light intensity as a function of wavelength. A typical arrangement for spectrometers used in analytical chemistry, medical, color measurement, and other applications incorporates a diffraction grating to spectrally disperse light from a broad spectrum source onto a photodiode array. Ideally, one narrow band of wavelengths in the broad spectrum source is uniquely focused onto a single photodiode in the photodiode array. However, in real systems, imperfections in the optical components, dust, scratches and so forth result in some inevitable scattering of light (sometimes referred to as Rayleigh scattering, Mie scattering, or other scattering types) resulting in some light intensity at each photodiode resulting from wavelengths in the light source that are outside the narrow band of wavelengths intended for each photodiode. This stray light affects the accuracy and linearity of the instrument.

Stray light is not the only limitation on accuracy and linearity. Other inherent limitations on ideal measurements in spectrometers include dark current, electronic offset, and higher grating orders. Each of these limitations is discussed below. In general, known systems reduce the effects of dark current, electronic offset and higher grating orders, and reduction of these limitations may also reduce the effects of stray light over part (but not all) of the measured spectrum. However, there is a need for improvement in reduction of the effects of stray light in a critical band of Ultraviolet (UV) wavelengths.

Photosensors typically have an inherent associated capacitance. Typically, the associated capacitance is charged in the dark and the photosensor discharges the capacitance in response to photons impinging onto the photosensor. Some current, known as dark current, may flow even if no light is impinging onto the photosensor. The dark current results in an offset in intensity measurements. In addition, electronics for measuring photosensor current flow may have some inherent electronic offset. Known spectrometer systems have shutters for blocking all light and it is known to measure a response while all light is blocked to measure dark current and other electronic offset.

In the following discussion, spectral absorption measurements and calculations are used as examples to illustrate both the background and the invention. It should be understood that the discussion applies equally to spectral transmission measurements and calculations. Absorption and transmission are related by the following equation: $A = -\log(T)$ where A is absorption and T is transmission.

In chemical absorption spectrometry, absorbance is ideally determined by the following equation:

$$A(\lambda) = \text{LOG} \left[ \frac{I_0(\lambda)}{I(\lambda)} \right] \quad \text{Equation (1)}$$

Where:

$I_0(\lambda)$ is a reference spectrum (photocurrent as a function of wavelength) measured with no sample present;

$I(\lambda)$ is a sample spectrum measured with the sample present; and $A(\lambda)$ is absorbance as a function of wavelength.

In discrete systems, $\lambda$ is replaced by an integer n representing an element of a photosensor array. In non-ideal systems, it is known to compensate both the reference spectrum and absorbance spectrum for offset due to the effects of dark current and electronic offset. The resulting equation with compensation is as follows:

$$A(n) = \text{LOG} \left[ \frac{I_0(n) - I_D(n)}{I(n) - I_D(n)} \right] \quad \text{Equation (2)}$$

Where:

$I_D(n)$ is a discrete dark spectrum (photocurrent as a function of photosensor number) measured with the light source turned off or with an opaque shutter blocking all light from the light source.

A diffraction grating returns light of a particular wavelength $\lambda$ at an angle $\alpha$ according to the equation $\sin(\alpha) = n\lambda/g$ where n is an integer and g is a constant length grating characteristic. Each wavelength $\lambda$ is returned at multiple angles. In addition, if a particular wavelength $\lambda$ is returned at an angle $\alpha$, then integral fractions of wavelength $\lambda$ ($\lambda/2$, $\lambda/3$, etc.) are returned at the same angle. For a particular angle $\alpha$, light returned having wavelength $\lambda$ is referred to as being in a first order, light returned having a wavelength $\alpha/2$ is referred to as being in a second order, and so forth. Typically, for any given photodiode in a spectrometer, the light intensity of interest is the light in the first order and the spectrometer system must compensate for the effects of higher orders. However, it may also be that the light of interest is the second or third order. In general, orders other than the order of interest must be suppressed.

Use of optical cut-off filters to suppress higher orders is known. Typically, these filters are opaque to light having wavelengths below a particular cut-off wavelength and transparent to light having wavelengths above the cut-off wavelength. For example, a filter having a cut-off wavelength of 700 nm will pass wavelengths of 900 nm but block corresponding second order wavelengths of 450 nm ($\lambda/2$) and third order wavelengths of 300 nm ($\lambda/3$). These cut-off filters may inherently also filter stray light resulting from scattering of light having wavelengths shorter than the filter cut-off wavelength. In systems having cut-off filters as described, intensities at longer wavelengths are measured with one or more filters inserted into the light path to suppress higher orders (shorter wavelengths) but intensities at the shortest wavelengths are typically measured with no filtering.

In analytical chemistry, the shortest UV wavelengths (for example 190 nm–400 nm) are critically important. As discussed above, spectrometer systems typically compensate for dark current and electronic offset, they typically filter higher orders, and they typically reduce the effects of short wavelength stray light over part of the spectrum as part of filtering for higher orders. However, there is typically no filtering of long wavelength stray light in the critical short wavelength UV band. There is a need for filtering or compensation of stray light in the critical range from 190 nm to 400 nm.

Wavelengths shorter than about 185 nm are blocked by oxygen in the atmosphere or by the optical materials in lamps, windows and lenses. Therefore, the stray light of concern is stray light having wavelengths greater than 400 nm. Ideally, an optical filter could be used that is transparent to wavelengths shorter than 400 nm and opaque to wavelengths longer than 400 nm. Unfortunately, there are no filters available that have high transmittance in the UV range of interest, low transmittance for wavelengths longer than UV, and having stable characteristics over a temperature range and humidity range required for instrumentation. Since there is no suitable filter for directly suppressing light outside the UV range, alternative methods are needed to reduce the effects of stray light in the UV range.

One approach is to eliminate one of the sources of stray light. In U.S. Pat. No. 4,798,464 (Boostrom), one light source is used for the UV range and a separate light source is used for visible (Vis) and near infrared (NIR) wavelengths. When measurements are being made in the UV range, the Vis/NIR source is blocked by an opaque shutter. This eliminates stray light from the separate Vis/NIR light source but does not eliminate stray light from long wavelengths present in the light from the UV light source. Typically, a Deuterium light source is used having a continuous light spectrum spanning approximately 200 to 400 nm but also having a high characteristic peak at 656.1 nm (the deuterium emission wavelength) and additional quasi-continuous intensity at wavelengths longer than 400 nm. For a typical deuterium lamp intended for a two-lamp system, 10–20% of the total lamp intensity is from wavelengths greater than 400 nm. In addition, there are deuterium lamps intended for single lamp systems (for the range from 190 nm to 820 nm) for which 50% of the total lamp intensity is from wavelengths greater than 400 nm. The peak at 656.1 nm and all other wavelengths greater than 400 nm having a substantial intensity may scatter and contribute to stray light in the 190 nm to 400 nm range.

U.S. Pat. No. 4,563,090 (Witte) discloses a grating spectrometer in which a spectrum is measured repeatedly while inserting different filters. A series of equations is generated, from which a computer calculates the partial spectra associated with the individual grating orders. A total spectrum is composed from these partial spectra. Multiple sequential measurements must be made, each with a separate filter in place, each measurement requiring time.

There is still a need for simple, rapid and comprehensive compensation for the effects of stray light in the UV range.

SUMMARY OF THE INVENTION

An object of the invention is to measure the effects of stray light in a spectrometer. An additional object is to use the stray light measurement to improve the accuracy and linearity of the spectrometer in a particular band of wavelengths. Additional objects are to measure and compensate for effects caused by the system for measuring stray light. In a sample embodiment, the spectrometer is used in absorption spectrometry and the particular band is in the short UV wavelengths.

In the sample embodiment, an optical cut-off filter is used to block short (UV) wavelengths and to transmit long wavelengths. A compensation intensity spectrum is measured with the filter in place. With the filter in place, intensities measured at UV wavelengths are a measure of the aggregate offset effects of stray light, dark current, and system electronics. Intensities measured at visible (Vis) and near infrared (NIR) wavelengths are used to measure of the insertion loss of the filter. A reference spectral measurement of the source is made without the filter and without a chemical sample present. A first compensation measurement is made with the filter present but without a chemical sample present. For Vis and NIR wavelengths, the integrated reference measurement is divided by the integrated first compensation measurement to obtain an insertion loss factor. For UV wavelengths, the first compensation measurement is multiplied by the insertion loss factor. A second compensation measurement is made with both the filter and a chemical sample present. For this second compensation measurement, a separate second insertion loss factor is determined analogous to the first compensation measurement. The second compensation measurement is multiplied by the second insertion loss factor. For UV wavelengths, the first compensation measurement (with insertion loss correction) is subtracted from a reference spectral measurement of the source and the second compensation measurement (with insertion loss correction) is subtracted from a sample spectral measurement. In addition, the compensation measurements are multiplied by factors estimating the amount of stray light having UV wavelengths and striking photosensors positioned to receive UV wavelengths. Finally, the equations are modified to account for non-ideal filter characteristics and for smoothing of jagged compensation spectra.

DESCRIPTION OF THE PREFERRED EMBODIMENTS

Figure 1:
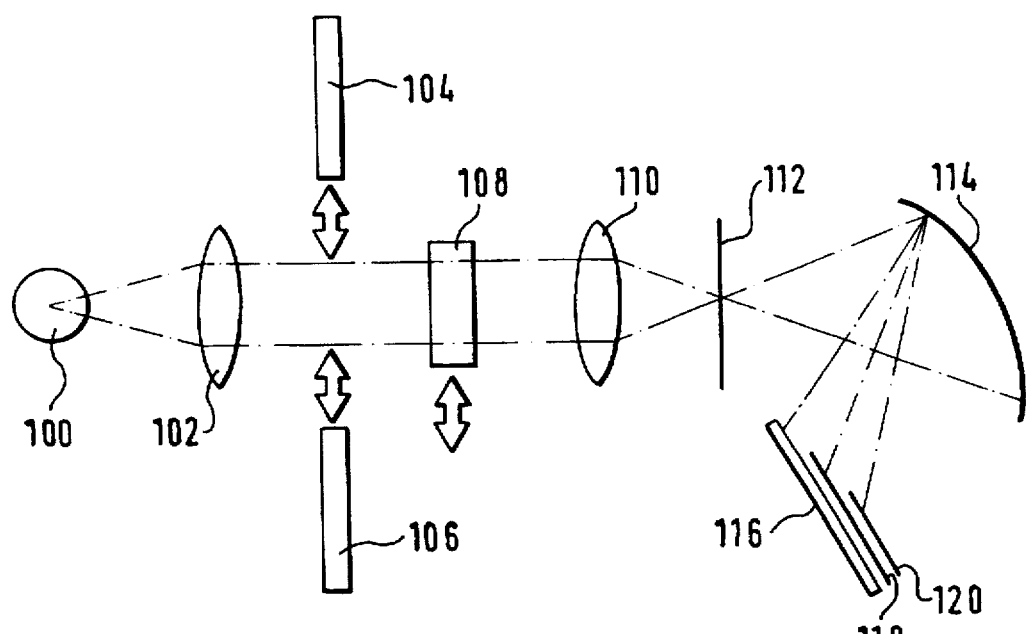
FIG. 1 is a block diagram of an example embodiment of a spectrometer incorporating the invention.

FIG. 1 illustrates an example embodiment of a spectrometer incorporating the invention. In FIG. 1, a light source 100 provides a broad continuous spectrum of light, radiating over a wide angle. An achromatic collimation lens system 102 transforms the radial light source into a light beam that is approximately coherent and parallel. A filter 104 (discussed in detail below) is moved into and out of the light path under control of a computer (not illustrated). An opaque shutter 106 is moved into and out of the light path, under control of the computer, to completely block light from the light source 100. A chemical sample 108 is moved into and out of the light path under computer control. A focusing lens 110 focuses the light onto a slit 112. The light then passes onto a diffraction grating 114 where it is spectrally dispersed as well as focused onto a photodiode array 116. Two optical cut-off filters (118 and 120) for suppressing higher orders are discussed in more detail below.

The system illustrated in FIG. 1 is conventional except for filter 104 and filters 118 and 120. With the exception of filter 104, there are many suitable variations for the arrangement and components of the system, including for example use of mirrors instead of lenses, use of prisms or optical wedges or other spectral dispersing means instead of a diffraction grating, and use of charge-coupled-device (CCD) arrays or other types of photosensors instead of photodiodes. Known systems have optical filters for suppressing higher orders located where filter 104 is located in FIG. 1 (for example, Boostrom). However, the use of filter 104 to reduce the effects of stray light in the short UV wavelengths as described below and the use of filter 104 in combination with filters 118 and 120 as described below are novel.

In a specific sample embodiment, lamp source 100 is an assembly combining a deuterium UV light source and a tungsten Vis/NIR light source. The resulting assembly provides quasi-continuous light over a spectrum of wavelengths from approximately 190 nm to 1100 nm. Filter 104 is a Schott GG420, a commercially available filter that blocks wavelengths shorter than 420 nm and transmits wavelengths longer than 420 nm. Filter 118 is a colored glass filter that blocks light having wavelengths shorter than 380 nm and transmits wavelengths longer than 380 nm. Filter 120 is a dielectric interference filter that blocks wavelengths shorter than 760 nm and transmits wavelengths longer than 760 nm.

Figure 2:
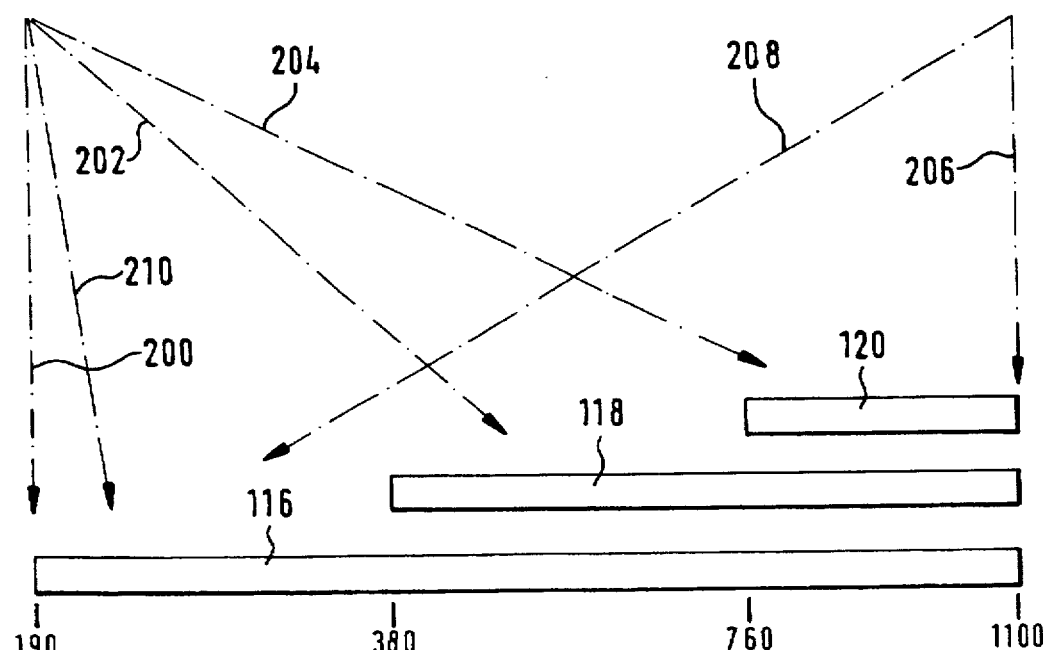
FIG. 2 is an expanded block diagram of a photodiode array and filters illustrated in FIG. 1.

FIG. 2 illustrates the photodiode array 116 in conjunction with filters 118 and 120. In an ideal system, each photodiode would receive only a very narrow band of wavelengths. In a real system, light at 190 nm (dashed line 200), in addition to being diffracted to higher orders, is partially scattered so that some 190 nm light is directed towards photosensors positioned to receive light in the 380 nm to 760 nm range (dashed line 202) and some 190 nm light is directed towards photosensors positioned to receive light in the 760 nm to 1100 nm range (dashed line 204). Likewise, light at 1100 nm (dashed line 206) is partially scattered so that some 1100 nm light impinges on photodiodes positioned to receive light in the 190 nm to 380 nm band. The photodiodes positioned to receive wavelengths between 190 nm and 380 nm have no filter. Photodiodes positioned to receive wavelengths from 380 nm to 760 nm are filtered by filter 118, which suppresses second order wavelengths and also suppresses stray light having wavelengths shorter than 380 nm (dashed line 202). Photodiodes receiving wavelengths from 760 nm to 1100 nm are filtered by both filter 118 and filter 120, filter 118 suppressing third order wavelengths and filter 120 suppressing second order wavelengths greater than 380 nm and stray light having wavelengths shorter than 760 nm (dashed line 204). Note that the combination of filters 118 and 120 suppress higher order wavelengths and also suppress stray light having UV wavelengths (dashed lines 202 and 204). However, for the photodiodes positioned to receive UV wavelengths from 190 nm to 380 nm, there is no filtering of stray light having Vis or NIR wavelengths (dashed line 208). As discussed above, in analytical chemistry, the UV spectral band from 190 nm to 400 nm is of critical importance and linearity and accuracy in that band are essential. For high linearity and accuracy, it is important for the system to suppress or compensate for stray light impinging on the photodiodes positioned to receive UV light.

The invention requires realization of a key principle—that if light from a light source is selectively blocked at a particular wavelength, and a finite intensity is detected at that particular wavelength, then the intensity detected at the particular wavelength is a measure of not just dark current and electronic offset, but also includes the incremental effects of stray light due to scattering of light at other wavelengths that are not blocked. Filter 104 blocks light in the UV range and transmits light having wavelengths longer than UV. If filter 104 is in place, any intensities indicated by photodiode array 116 in the UV range blocked by filter 104 includes the effects of stray light caused by scattering of longer wavelength light. An intensity spectrum is measured with filter 104 in the light path. For the UV photosensors only, the aggregate effects including stray light are used for compensation in Equation (2) instead of the just the dark current and electronic offset effects measured with an opaque shutter in place. Note that the effects of stray light may be different with a chemical sample in place than the effects with the chemical sample removed. Therefore, two stray light compensation spectra are measured, one with the chemical sample present and one with the chemical sample not present.

Note in the following equations that a range of wavelength λ is specified in discrete equations. In each case, the range should be interpreted as the number n corresponding to a photosensor that is positioned to receive the wavelength λ in a particular embodiment. That is, assuming the range is from 190 nm to 1100 nm, λ=190 corresponds to n=1 and λ=1100 corresponds to the largest value of n (total number of photosensors in array 116) in the particular embodiment. Equation (2) as modified to compensate for stray light in the UV band is then as follows:

$$A(n) = \text{LOG}\left[\frac{I_O(n) - I_{OS}(n)}{I(n) - I_S(n)}\right]_{\lambda=190}^{400} \quad \text{Equation (3A)}$$

$$A(n) = \text{LOG}\left[\frac{I_O(n) - I_D(n)}{I(n) - I_D(n)}\right]_{\lambda=401}^{1100} \quad \text{Equation (3B)}$$

Where:

$I_{os}(n)$ is a reference compensation spectrum measured with filter 104 in the light path but without sample 108 in the light path and, $I_s(n)$ is a sample compensation spectrum measured with both filter 104 and sample 108 in the light path.

Note that filter 104 has some insertion loss because of reflection at the two surfaces of the filter, some absorption by the filter, and dirt on the filter surfaces. A first insertion loss factor is computed by dividing the integral of the discrete reference spectrum of the light source (no filter 104 present, no chemical sample present) for all wavelengths greater than 400 nm (the wavelengths where filter 104 is transparent) by the integral over the same wavelengths of the same light source measurement with the filter present. All measurements with the filter in place but with no chemical sample in place are then multiplied by the first insertion loss factor (typically 1.1–1.2) to compensate for insertion loss. A second insertion loss factor is computed by dividing the integral of the discrete sample spectrum (chemical sample present) for all wavelengths greater than 400 nm by the integral over the same wavelengths of the same sample spectrum measurement with the filter present. The second stray light compensation spectrum (chemical sample present) is multiplied by the second insertion loss factor. Equations (3A) and (3B) modified to compensate for insertion loss are then as follows:

$$A(n) = \text{LOG}\left[\frac{I_O(n) - I_{OS}(n)*L_O}{I(n) - I_S(n)*L}\right]_{\lambda=190}^{400} \quad \text{Equation (4A)}$$

$$A(n) = \text{LOG}\left[\frac{I_O(n) - I_D(n)}{I(n) - I_D(n)}\right]_{\lambda=401}^{1100} \quad \text{Equation (4B)}$$

Where $L_o$ is the insertion loss factor with no sample present computed as follows:

$$L_O = \frac{\sum_{\lambda=421}^{1100} I_O(n)}{\sum_{\lambda=421}^{1100} I_{OS}(n)}$$

And where L is the insertion loss factor with chemical sample 108 inserted into the light path and computed as follows:

$$L = \frac{\sum_{\lambda=421}^{1100} I(n)}{\sum_{\lambda=421}^{1100} I_S(n)}$$

As discussed above, the compensation spectra $I_{os}(n)$ and $I_s(n)$ (with compensation for insertion loss) measure the intensity of light having Vis and NIR wavelengths but scattered toward photodiodes positioned to receive only UV wavelengths. There is an additional factor contributing to nonlinearity and inaccuracy that has not been measured or compensated by the above equations, and that is the intensity of light having UV wavelengths but scattered toward photodiodes within the UV wavelengths (other than the appropriately positioned diodes). For example, in FIG. 2, dashed line 210 represents light having a wavelength of 190 nm being scattered toward a diode in the UV band other than the diode positioned to receive light at 190 nm. Note that the light corresponding to dashed line 210 is not filtered by filters 118 or 120 and the resulting effects are not measured or compensated by the above equations. Therefore, the stray light intensity in the UV wavelengths is actually greater than $I_{os}(n)$ and $I_s(n)$ as measured above and corrected for insertion loss. As a first order estimate of the effects of UV stray light, it is reasonable to assume that the band of UV wavelengths contribute the same percentage of total integrated intensity to stray light as the band of Vis and NIR wavelengths. Therefore, it is reasonable to multiply the reference compensation spectrum $I_{os}(n)$ (filter, no sample) by a correction factor $K_o$, where $K_o$ is a stray light multiplier compensating for the effect of UV stray light in the UV band and insertion loss without the sample 108 present. $K_o$ is estimated as the area of the reference spectrum $I_o$ divided by the area of the reference compensation spectrum $I_{os}$. Likewise, it is reasonable to multiply the sample compensation spectrum $I_s(n)$ by a correction factor K, where K is a stray light multiplier compensating for the effect of UV stray light in the UV band and insertion loss with sample 108 present. K is estimated as the area of the sample spectrum I divided by the area of the sample compensation spectrum $I_s$. The equations, compensating for Vis and NIR stray light in the UV band, insertion loss, and UV stray light in the UV band are as follows:

$$A(n) = \text{LOG} \left[ \frac{I_O(n) - I_{OS}(n)*K_O}{I(n) - I_S(n)*K} \right]_{\lambda=190}^{400} \quad \text{Equation (5A)}$$

$$A(n) = \text{LOG} \left[ \frac{I_O(n) - I_D(n)}{I(n) - I_D(n)} \right]_{\lambda=401}^{1100} \quad \text{Equation (5B)}$$

Where $$K_O = \frac{\sum_{\lambda=190}^{1100} I_O(n)}{\sum_{\lambda=190}^{1100} I_{OS}(n)}$$

and $$K = \frac{\sum_{\lambda=190}^{1100} I(n)}{\sum_{\lambda=190}^{1100} I_S(n)}$$

There are two additional refinements needed to achieve the best possible accuracy and linearity. The first refinement accounts for the fact that it is physically unreasonable that the Vis and NIR light does produce stray light in the UV range and no stray light in the Vis spectral range. The above equations would result in a step in the absorption spectrum at 400 nm.

In the specific example embodiment (equation 4A and 4B), a first order correction is made by multiplying the compensation spectra $I_{os}(n)$ and $I_s(n)$ by a fraction F in the range of wavelengths from 400 nm to 600 nm where F is 1.0 at the value of n corresponding to a wavelength of 400 nm and F is 0.0 at the value of n corresponding to a wavelength of 600 nm with a linear or other smooth transition between 400 nm and 600 nm.

The second refinement provides smoothing of jagged lines.

Note that stray light generally has low intensity and may be somewhat random. As a result, the compensation spectra $I_{os}(n)$ and $I_s(n)$ may be very jagged. The correction spectra can be smoothed by sampling multiple times and averaging multiple samples at each photosensor or by simply computing a smoothing curve, for example, by computing a running average of measurements from adjacent photosensors.

What is claimed is:

1. A method of improving accuracy of a spectrometer within a particular band of wavelengths, the method comprising the following steps:

(a) illuminating a photosensitive device with a light source having a source spectrum of wavelengths;

(b) blocking the particular band of wavelengths within the source spectrum, but not the entire source spectrum;

(c) measuring a sample compensation spectrum as the response of the photosensitive device while the particular band of wavelengths are blocked, with a sample present, the response of the photosensitive device at wavelengths within the particular ban of wavelengths being a measure of aggregate offset, including the effects of stray light;

(d) measuring a sample intensity spectrum without the particular band of wavelengths being blocked;

(e) computing the area of the sample intensity spectrum for all wavelengths outside the particular band of wavelengths;

(f) computing the area of the sample compensation spectrum for all wavelengths outside the particular band of wavelengths;

(g) computing an insertion loss multiplier as the area of step (e) divided by the area of step (f);

(h) multiplying the sample compensation spectrum of step (c) by the insertion loss multiplier of step (g) and;

(i) subtracting the sample compensation spectrum as modified in step (h) from the sample intensity spectrum of step (d), within the particular band of wavelengths, to obtain an improved sample intensity spectrum.

2. The method of claim 1, further including a method of compensation for a finite blocking transition, comprising the following additional step:

(j) multiplying the sample compensation spectrum as modified in step (h) by a scaling factor F, F having a value of 1.0 at a first wavelength and a value of 0.0 at a second wavelength and having a linear transition from 1.0 to 0.0 for wavelengths between the first and second wavelengths.

3. The method of claim 1, further including a method of smoothing, comprising the following additional steps before step (d):

(c1) repeating step (c) multiple times; and (c2) replacing C(n) with the average of multiple measurements of C(n), resulting from step (c1), where C(n) refers to a discrete value of the compensation spectrum of step (c).

4. The method of claim 1, further including a method of smoothing, comprising the following additional step:

(c1) replacing C(n) with an average including the average of C(n−1), C(n) and C(n+1), where C(n) refers to a discrete value of the compensation spectrum of step (c).

5. A method of improving accuracy of a spectrometer within a particular band of wavelengths, the method comprising the following steps:

(a) illuminating a photosensitive device with a light source having a source spectrum of wavelengths;

(b) blocking the particular band of wavelengths within the source spectrum, but not the entire source spectrum;

(c) measuring a sample compensation spectrum as the response of the photosensitive device while the particular band of wavelengths are blocked, with a sample present, the response of the photosensitive device at wavelengths within the particular band of wavelengths being a measure of aggregate offset, including the effects of stray light;

(d) measuring a sample intensity spectrum without the particular band of wavelengths being blocked;

(e) computing the area of the sample intensity spectrum for all wavelengths;

(f) computing the area of the sample compensation spectrum for all wavelengths;

(g) computing an stray light multiplier as the area of step (e) divided by the area of step (f); and (h) multiplying the sample compensation spectrum of step (c) by the stray light multiplier of step (g) and;

(i) subtracting the sample compensation spectrum as modified in step (h) from the sample intensity spectrum of step (d), within the particular band of wavelengths, to obtain an improved sample intensity spectrum.

6. The method of claim 5, further including a method of smoothing, comprising the following additional steps before step (d):

(c1) repeating step (c) multiple times; and (c2) replacing $C(n)$ with the average of multiple measurements of $C(n)$, resulting from step (c1), where $C(n)$ refers to a discrete value of the compensation spectrum of step (c).

7. The method of claim 5, further including a method of smoothing, comprising the following additional step:

(c1) replacing $C(n)$ with an average including the average of $C(n-1)$, $C(n)$ and $C(n+1)$, where $C(n)$ refers to a discrete value of the compensation spectrum of step (c).

* * * * *